Aug. 12, 1930.   C. E. BROWN   1,772,701
SAW HOLDER
Filed July 21, 1925   2 Sheets-Sheet 1
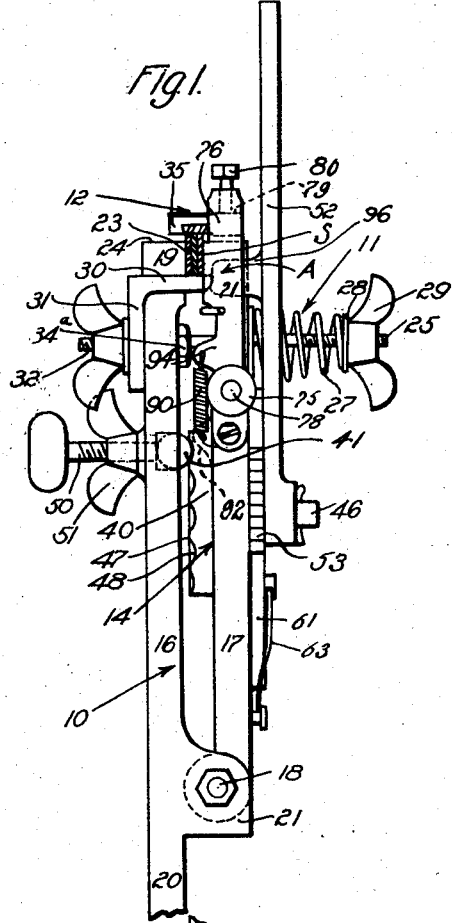
Inventor
Claude E. Brown
by W. K. Maxwell
Attorney Aug. 12, 1930.  C. E. BROWN  1,772,701
SAW HOLDER
Filed July 21, 1925  2 Sheets-Sheet 2
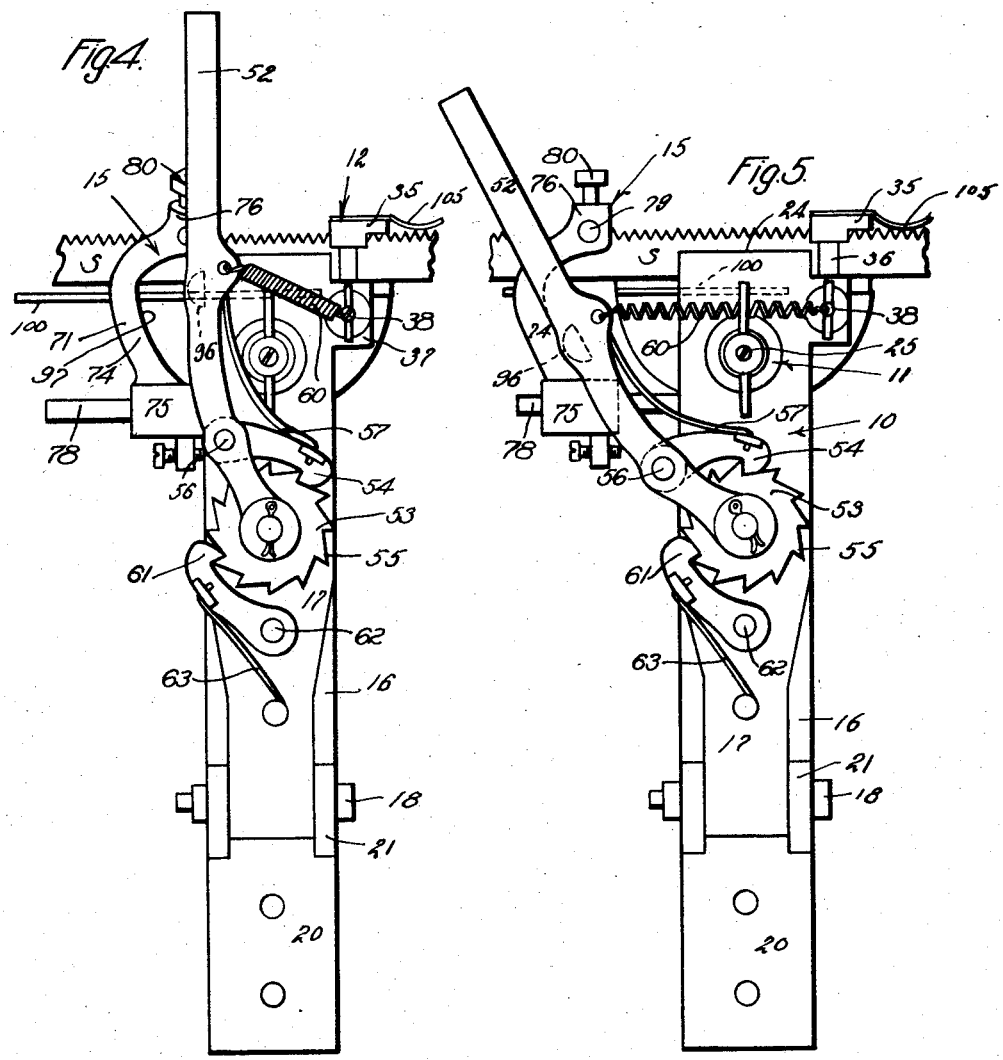
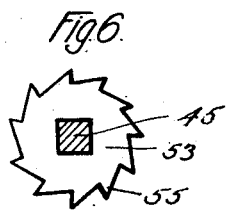
Inventor
Claude E. Brown
by W. K. Maxwell
Attorney Patented Aug. 12, 1930

1,772,701

UNITED STATES PATENT OFFICE

CLAUDE E. BROWN, OF SANTA ANA, CALIFORNIA

SAW HOLDER

Application filed July 21, 1925. Serial No. 45,021.

This invention has to do with a saw holder and it is a general object of the invention to provide a saw holder which is simple, effective and easily operated.

The device provided by this invention is useful, generally for holding saws while they are being filed. It is particularly useful, however, in holding band saws, so therefore, I will throughout this description refer to this particular type of saw, it being understood that such reference is not to be construed as restricting the use of the device to this or any other particular type of saw.

An object of this invention is to provide a device which effectively holds a saw while it is being filed and is operable to advance or feed the saw as the filing progresses.

Another object of this invention is to provide improvements in arrangement and construction of parts for devices of this general character.

A further object of this invention is to provide a saw holder in which a saw can be evenly and quickly filed.

The various objects and features of my invention will be best and more fully understood from the following detailed description of a typical preferred form of the invention throughout which description reference is had to the accompanying drawings in which Fig. 1 is an end elevation of the device embodying the invention showing the saw advancing means engaging the saw to move it.

Fig. 2 is a vertical transverse sectional view of the device.

Fig. 3 is a plan view of the device.

Fig. 4 is a side elevation of the device showing it in its normal position.

Fig. 3A is a view similar to a portion of Fig. 1 showing another form of construction.

Fig. 5 is a view similar to Fig. 4 showing the device completely actuated, and

Fig. 6 is a detailed sectional view taken as indicated by line 6—6 on Fig. 2.

The device provided by this invention includes, generally, a saw holding clamp 10, means 11 normally yieldingly operating the clamp so that it normally grips and holds a saw arranged in it, means 12 for guiding the saw in the clamp, means 14 operable to release the clamp so that the saw is movable therein, and means 15 operating to advance or move the saw while it is released.

The saw holding clamp comprises two arms 16 and 17 pivotally connected together at their lower ends by a pivot bolt 18 and provided at their upper ends with cooperating saw engaging jaws 19. In the particular form of construction shown in the drawings the arm 16 is provided at its lower end with a downwardly extending extension 20 by which the device may be held in a vise, or the like, or may be mounted on a suitable support. The lower end of the arm 17 extends between spaced lugs 21 provided on the lower end of the arm 16. The pin 18 extends through the lower end of the arm 17 and the lugs 21. The jaws 19 have flat parallel saw engaging faces 23 and may be finished so that their top faces 24 are flat and coplanar.

The means 11 operates to normally yieldingly urge or hold the arms together causing the jaws of the clamp to hold a saw, or the like, arranged between them, this means includes a stud 25 projecting from one arm freely through an opening 26 in the other arm and carrying a spring 27. In the arrangement shown in the drawings the stud 25 is carried by and projects from the inner side of the arm 16 through an opening 26 in the arm 17. The spring 27, which is a compression spring, is arranged on the part of the stud which projects from the arm 17 and is confined between the outer side of the arm 17 and a washer 28 carried on the stud. The washer 28 is held or retained on the stud by a nut, for instance, a wing nut 29 screw threaded on the projecting end portion of the stud. With this construction the spring when under compression yieldingly urges the arms together causing the jaws to grip the saw arranged between them. The wing nut 29 provides adjustability in the means 11 as the pressure or force with which the arms are urged together may be adjusted or regulated by varying the position of the wing nut on the stud. For instance, by screwing the wing nut inwardly on the stud the compression strain coming on the spring is increased thus increasing the force with which the arms are urged together. In handling a band saw in the device, which type of saw has a narrow blade in the form of an endless loop, the saw may be twisted or looped in the manner familiar to those used to handling band saws so that it has a plurality of parts adjoining each other. These adjacent parts of the band saw may be arranged or clamped together simultaneously in the clamp device, care being taken that correspondingly pitched teeth of the several parts be arranged in register.

The means 12 provided for guiding the saw part or parts, as the case may be, in the jaws includes a rest adjustably carried by one of the arms and provided with horizontal parts 30 which extend across the end portions of the jaws 19 in the manner clearly illustrated throughout the drawings. In accordance with the preferred form of my invention the horizontal rest parts 30 are formed on or extend from a common body 31 which engages the outer side of one of the arms, for instance, the arm 16. The body 31 is adjustably connected with the arm 16 by a stud 32 projecting from the arm through an elongate slot 33 in the body and a nut, for instance, a wing nut 34, applied to the outer part of the stud to clamp the body to the arm to hold it in the desired position. In accordance with my invention the studs 25 and 32 are formed of a single rod or bar arranged through the arm 16 so that one end projects toward the arm 17 to form a stud 25 while the other end projects outwardly from the arm 17 to form the stud 32. The rod forming the studs 25 and 32 may be screw threaded into the arm 16 and may be set in position by a nut 34 screw threaded onto it to clamp against the inner side of the arm 16. The guide means 12 may further include a retainer 35 adapted to extend across or over the saw parts arranged in the jaws to hold them in the jaws and in proper relation to the horizontal rest parts 30. This retainer which extends horizontally across the saw parts is preferably located at one end of the jaws, for instance, the end of the jaws through which the saw parts enter when the device is operated as hereinafter described. The retainer is carried on a vertically disposed stem 36 slidably carried in a lug 37 projecting from one end of the arm 17. A set screw 38 is carried by the lug to set the stem in position in the lug. With this construction the retainer 35 can be adjusted vertically to the desired position by sliding the stem longitudinally in the lug and can be rotated into and out of operative position by rotation of the stem in the lug.

The means 14 provided by my invention for releasing the jaws 19 to allow movement of the saw parts between them includes a cam disc 40 rotatably carried at the inner side of one of the arms and a part 41 which projects from the inner side of the other arm to cooperate with the disc. In the arrangement shown in the drawings the disc is rotatably carried by the arm 17 while the projecting part is carried by the arm 16. The disc 40 is formed with a trunnion 43 which is rotatably carried in an opening 44 formed through the arm 17 and which is provided at the outer side of the arm 17 with a square part 45 and then a round bearing part 46. The outer face 47 of the disc is provided with a plurality of radially disposed grooves or depressions 48. The projecting part 41 carried by the arm 16 is located to engage the disc 40 near its periphery and is adapted to fit or extend into the depressions when the vise is in normal working position. In the preferred form of my invention the projecting part 41 is in the form of a ball carried in a socket 49 provided in the inner side of the arm 16 so that it is rotatable and projects from the inner side of the arm. When the disc 40 is in position where the projection extends into one of the depressions 48 the arms 16 and 17 are held together by the action of the spring 11 to clamp the saw parts S between the jaw parts 19. However, when the disc is rotated from this position to a position where the projection engages the outer face 47 of the disc and until the projection enters another depression the projection and disc cooperate to spread the arms 16 and 17 so that the jaws 19 release the saw parts S. It will be obvious that the amount that the arms are moved or spread by this action will depend upon the depth of the depressions 48 in the face of the disc. In order to adjust or set the device to operate with the jaws spaced various distances apart, for instance, spaced to accommodate various numbers of saw parts, I provide means for adjusting the amount the projecting part 41 extends from the inner side of the arm 16. This means may include an adjusting screw 50 carried by the arm 16 to extend into the bottom of the socket 49 so that it is operable to force or hold the ball in positions where it projects various amounts from the arm 16. The screw 50 may be provided with a locking means in the form of a wing nut 51. To accomplish the desired rotation of the disc 40 in order to cause the operation just described a lever 52 is rotatably mounted on the bearing part 46, at the outer end of the trunnion projecting from the disc, and a pawl and ratchet connection is provided between the lever and disc. This pawl and ratchet mechanism may include a ratchet wheel 53 mounted on the square part 45 of the trunnion so that it is fixed against rotation with reference to the disc and a pawl 54 carried by the lever 52 to cooperate with the teeth 55 of the ratchet wheel. The pawl 54 may be pivotally connected to the lever by a pin 56 and may be normally yieldingly held in position to cooperate with the ratchet wheel by a spring 57. With this construction the disc will be rotated by swinging or oscillating the lever from a position such as is shown in Fig. 4 to one such as is shown in Fig. 5. Upon return of the lever from the position shown in Fig. 5 to that shown in Fig. 4 the pawl ratchets over the teeth of the ratchet wheel so that the disc is not operated. In the preferred relationing and proportioning of parts one operation of the lever causes the discs to be rotated a distance corresponding to the space between adjacent depressions so that a disc rotates to move one depression out of register with the projection 41 and bring an adjacent projection into register with it. During the operation the projection rides on the face 47 of the disc causing the arms 16 and 17 to be held apart. Means is preferably provided for returning the lever to the position shown in Fig. 4 which means may include a tension spring 60 arranged between the lever and a relatively fixed part, for instance, the set screw 38. Further, it is desirable to provide means for positively preventing counter rotation of the disc when the lever is being returned to a normal position which means may include a pawl 61 mounted on the arm 17 by a pivot pin 62 and normally held in cooperative engagement with the ratchet wheel by spring 63. The pawl 61 faces in the opposite direction to the pawl 54 therefore prevents backing up of the ratchet wheel and yet allows it to rotate freely in the desired direction.

The means 15 provided by this invention includes a gripping part 70 adapted to engage or grip the saw parts carried by the device, a carrier 71 for the gripping part adapted to carry it horizontally and parallel to the saw parts and an operating connection between the lever 52 and carrier 71 whereby the carrier operates to cause movement of the saw parts through the gripping part while the saw parts are released by the jaws. The carrier 71 includes a cam shaped arm 74, a bearing part 75 at one of the arms and a head 76 at the other end of the arm. The bearing 75 is slidably carried on a round guide shaft 78 projecting horizontally from the arm 17 in the direction in which the saw parts are fed between the jaws. The shaft 78 slidably carries the bearing part 75 of the carrier. The gripping part 70 has a round inner end 79 carried in a round opening in the head 76 and a polygonal, for instance, triangular projecting part, set so that one of its corners will engage or mesh in the teeth of the saw parts. The gripping part when arranged in the desired rotative position is set by a set screw 80 carried by the head 76. A spring 90 is arranged in connection with the carrier to urge it inwardly or toward the arm 17 and to normally yieldingly tend to turn it in the direction indicated by the arrow A in Fig. 1 so that the gripping part 35 engages the teeth of the saw parts. The spring in order to accomplish this function may be connected between a fixed part, for instance, a lug 92 on the arm 17 and an offset point on the carrier, for instance, to a lug 94 projecting from the arm 74 of the carrier. The carrier has a normal or unactuated position in which the part 70 is out of engagement with the saw. A spring 100 opposes the spring 90 to hold the carrier in the normal position. The desired operative connection may be established between the lever 52 and carrier by providing the lever with a horizontal transverse extension or projection 96 to cooperate with the cam like side 97 of the carrier arm 74. When the lever 52 is operated the projection 96 and side 97 of the carrier cooperate so that the carrier is first turned or swung from the normal position into engagement with the saw teeth, as shown throughout the drawings, and is then moved along the shaft 78 to advance the saw. The arm 74 and projection 79 are related and proportioned so that they do not cooperate to move the carrier until the arms 16 and 17 have been spread by the action of the disc and projection 41 and so that they cooperate to hold the part 35 in engagement with the saw and move the carrier outwardly from the position shown in Fig. 4 to that shown in Fig. 5 upon complete operation of the lever from the position shown in Fig. 4 to that shown in Fig. 5. When the lever has been operated to the position shown in Fig. 5 and when released it is returned by the spring 60 and the carrier is returned by the spring 90. A spring 100 may be provided to engage the carrier to normally hold it in the unactuated position where it is clear of the saw. The spring 100 turns at the end of its movement to lift the part 70 out of engagement with the saw so that the part 70 does not engage the saw teeth as the parts are returned. Upon the lever being actuated the forced engagement of the part 70 with the teeth holds the part against the teeth, and upon the lever completing its movement the spring 100 overcomes the action of the spring 90 and releases the part 70.

The action just described may be obtained by other means, for instance, it may be obtained by the construction shown in Fig. 3A. In this construction the springs 90 and 100 are not used, but a single spring $90^a$ is connected to a lug $90^b$ extending downwardly from the bearing part 75 in a manner to normally urge the arm 74 in the direction opposite to that indicated by the arrow A in Fig. 1. With this construction, the projection upon engaging this arm turns it in the direction indicated by arrow A against the resistance of spring $90^a$ causing the part 70 to engage the saw teeth.

Means may be provided for offering some resistance to movement of the saw parts so that they do not accidentally move when released. This means may include a pressure foot or spring 105 mounted to press against the saw parts as shown in the drawings.

Means may be provided to adjust the stroke or movement of the arm 74 to suit the spacing of the saw teeth. This means may include a stop screw carried by the arm 74 to engage the side of the arm, 17.

In the operation of the device the arms are moved to about the desired spaced relation by operation of the screw 50 whereupon the saw part or parts, as the case may be, are arranged between the jaws, the guide means set and the screw 50 adjusted to accurately function with the particular spacing of the arms occurring when the saw parts are in place between the jaws. With the saw parts thus set in the device and the gripping part 35 set to properly engage the saw teeth the device is ready for operation. The operator files the teeth of the saw parts where held firmly by the jaws 19 and when it is desired to advance the saw parts he operates the lever 52 from the position shown in Fig. 4 to that shown in Fig. 5. This operation first releases the jaws so that the saw parts can be moved and then causes movement of the carrier so that the saw parts are slid between the jaws bringing it into position at the jaw teeth which have not been filed. When the lever reaches the position shown in Fig. 5 the jaws are again set to hold the saw parts so that the lever can be released and returned to the position which is shown in Fig. 4, and the carrier returned to its normal position ready for another operation.

Having described only a typical preferred form of my invention I do not wish to limit myself to the specific details set forth, but wish to reserve to myself any changes or variations that may appear to those skilled in the art or fall within the scope of the following claims.

Having described my invention, I claim:

1. A device of the character described including a saw holding clamp having jaws normally clamping the saw, means for releasing the jaws, comprising a projection on one of the jaws and a cam part on the other jaw cooperating with the projection, means for advancing the saw, and a single means operable to actuate the releasing means and the advancing means.

2. A device of the character described including a saw holding clamp having jaws normally clamping the saw, means for releasing the jaws, comprising a projection on one of the jaws and a cam disc rotatably carried by the other jaw to cooperate with the projection, means for advancing the saw, and a single means operable to actuate the releasing means and the advancing means.

3. A device of the character described including a saw holding clamp having jaws normally clamping the saw, means for releasing the jaws, comprising a projection adjustably carried by one jaw and a cam disc rotatably carried by the other jaw, the disc having an irregular face cooperating with the projection, means for advancing the saw, and a single means operable to actuate the releasing means and the advancing means.

4. A device of the character described including a saw holding clamp having jaws normally clamping the saw, means for releasing the jaws, comprising a disc rotatably carried by one jaw and having an irregular face and a ball carried by the other jaw to cooperate with the face, means for advancing the saw, and a single means operable to actuate the releasing means and the advancing means.

5. A device of the character described including a saw holding clamp having jaws normally clamping the saw, means for releasing the jaws, means for advancing the saw, comprising a guide parallel with the saw, a saw engaging part slidably carried by the guide, and means whereby said part engages the saw when moved in one direction and is held out of engagement with the saw when moved in the other direction, and a single means operable to actuate the releasing means and the advancing means.

6. A device of the character described including a saw holding clamp having jaws normally clamping the saw, means for releasing the jaws including a cam disc rotatably carried by one of the jaws to cooperate with a part of the other jaw, means for advancing the saw, means operable to actuate the releasing means and the advancing means including an operating lever and a ratchet drive between the operating lever and the cam disc.

7. A device of the character described including the saw holding clamp having jaws normally clamping the saw, means for releasing the jaws, means for advancing the saw including a member mounted for reciprocation and to engage the saw, and means operable to actuate the releasing means and advancing means including a lever having a part engaging said member to move it into engagement with the saw and to move it so that it advances the saw upon the lever being actuated in one direction.

8. A device of the character described including the saw holding clamp having jaws normally clamping the saw, means for releasing the jaws, means for advancing the saw including a member mounted for reciprocation and to engage the saw, and means operable to actuate the releasing means and advancing means including a lever having a part engaging said member to move it into engagement with the saw and to move it so that it advances the saw upon the lever being actuated in one direction, and means whereby said member is held out of engagement with the saw when moved in the other direction.

9. A device of the character described including the saw holding clamp having jaws normally clamping the saw, means for releasing the jaws, embodying a cam member rotatably carried by one of the jaws, means for advancing the saw embodying a member mounted for reciprocation and normally held in predetermined position, and means operable to actuate the releasing means and advancing means including an operating lever, a ratchet driving connection between the lever and cam member, and a part on the lever engaging the said member to move it out of said position and hold it in engagement with the saw during said movement.

10. A device of the character described including a saw holding clamp having two jaws, means normally yieldingly urging the jaws together, saw guiding means in connection with the jaws, means for releasing the jaws including a projection on one of the jaws and a cam disc rotatably carried by the other jaw having a face cooperating with the projection, means for advancing the saw including a guide parallel with the saw, a member slidably and rotatably carried by the guide, and spring means whereby said member is normally in position to engage the saw when at the inner end of its movement and is normally out of engagement with the saw at the outer end of its movement, a pivoted operating lever, a ratchet drive connection between the operating lever and the cam disc, and a part in connection with the lever engaging said member to move it from its in position to its out position and operating to hold it in engagement with the saw during said movement.

11. A device of the character described including a saw holding clamp having jaws normally clamping the saw, means for releasing the jaws, comprising a disc rotatably carried by one jaw and having an irregular face, a ball carried by the other jaw to cooperate with the face, and means for adjusting the cam relative to the jaw carrying it, means for advancing the jaw, and a single means operable to actuate the releasing means and the advancing means.

In witness that I claim the foregoing I have hereunto subscribed my name this 15th day of July, 1925.

CLAUDE E. BROWN.